(12) United States Patent
Schlieski et al.

(10) Patent No.: US 9,191,553 B2
(45) Date of Patent: Nov. 17, 2015

(54) SYSTEM, METHODS, AND COMPUTER PROGRAM PRODUCTS FOR MULTI-STREAM AUDIO/VISUAL SYNCHRONIZATION

(75) Inventors: Tondra J. Schlieski, Hillsboro, OR (US); Brent M. Selmins, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/994,771

(22) PCT Filed: Sep. 30, 2011

(86) PCT No.: PCT/US2011/054450
§ 371 (c)(1),
(2), (4) Date: Jun. 17, 2013

(87) PCT Pub. No.: WO2013/048506
PCT Pub. Date: Apr. 4, 2013

(65) Prior Publication Data
US 2013/0278826 A1    Oct. 24, 2013

(51) Int. Cl.
*H04N 21/43* (2011.01)
*H04N 5/04* (2006.01)
*H04H 20/18* (2008.01)
(Continued)

(52) U.S. Cl.
CPC ............. *H04N 5/04* (2013.01); *G11B 27/10* (2013.01); *H04H 20/18* (2013.01); *H04N 21/4307* (2013.01); *H04N 21/4622* (2013.01); *H04N 21/4755* (2013.01); *H04N 21/485* (2013.01); *H04N 21/812* (2013.01)

(58) Field of Classification Search
CPC .................... H04N 21/4307; H04N 20/18
See application file for complete search history.

(56) References Cited

U.S. PATENT DOCUMENTS 5,754,534 A    5/1998  Nahumi
6,630,963 B1 *  10/2003  Billmaier .................. 348/485
(Continued)

FOREIGN PATENT DOCUMENTS

WO    2013048506 A1    4/2013

OTHER PUBLICATIONS

International Preliminary Report on Patentability Received for PCT Patent Application No. PCT/US2011/054450, mailed on Apr. 10, 2014.

(Continued)

*Primary Examiner* — Robert Hance
(74) *Attorney, Agent, or Firm* — Garrett IP, LLC (57) ABSTRACT

Methods, systems and computer program products for the synchronization of media streams. In an embodiment, a gross synchronization may first be performed on the media streams, using the broadcast delays of the streams. A refined synchronization may then be performed, taking advantage of corresponding visual or audio cues in each stream. In the event that the media streams represent the same content (e.g., the same content from different providers), matching momentary actions in the video media streams may be used to achieve refined synchronization. In the event that the media streams are different (e.g., different broadcasts of the same event), other cues may be used to achieve refined synchronization, where these other cues are part of the underlying event but independent of the particular broadcasts. Examples of these latter cues may be the sound of a referee's whistle or the crack of a bat hitting a baseball.

17 Claims, 6 Drawing Sheets (51) Int. Cl.
*H04N 21/462* (2011.01)
*H04N 21/475* (2011.01)
*H04N 21/485* (2011.01)
*H04N 21/81* (2011.01)
*G11B 27/10* (2006.01)

(56) References Cited

U.S. PATENT DOCUMENTS

| | | | |
|---|---|---|---|
| 8,437,620 B2 | 5/2013 | Schlieski et al. | |
| 2001/0008531 A1* | 7/2001 | Lanigan et al. | 370/432 |
| 2002/0103919 A1* | 8/2002 | Hannaway | 709/231 |
| 2003/0156827 A1* | 8/2003 | Janevski | 386/96 |
| 2003/0200001 A1 | 10/2003 | Goddard | |
| 2003/0208765 A1 | 11/2003 | Urdang et al. | |
| 2005/0060741 A1* | 3/2005 | Tsutsui et al. | 725/32 |
| 2006/0187358 A1* | 8/2006 | Lienhart et al. | 348/661 |
| 2009/0040311 A1* | 2/2009 | Okamoto et al. | 348/181 |
| 2009/0116543 A1* | 5/2009 | Schiff et al. | 375/227 |
| 2010/0005501 A1* | 1/2010 | Stokking et al. | 725/115 |
| 2012/0033035 A1* | 2/2012 | Lee et al. | 348/42 |
| 2012/0328062 A1* | 12/2012 | Kang | 375/357 |
| 2013/0079151 A1* | 3/2013 | Lockton et al. | 463/42 |

OTHER PUBLICATIONS

International Search Report and Written Opinion Received for International Application No. PCT/US2011/054450, mailed Apr. 26, 2012, 10 pages.

* cited by examiner

SYSTEM, METHODS, AND COMPUTER PROGRAM PRODUCTS FOR MULTI-STREAM AUDIO/VISUAL SYNCHRONIZATION

BACKGROUND

In a modern media environment, multiple media providers may provide broadcast coverage of the same event. A sporting event involving a team associated with a certain city may be covered by a television or radio station in that city, as well as by a national television network. A local radio team may travel with a National Basketball Association team, for example, and broadcast every game. The game may also be televised by one of several competing national networks. Coverage of other public events may also be broadcast by several networks or stations. A public radio station may broadcast coverage of a presidential speech, in parallel with the major television networks, for example.

Some users may wish to take advantage of the fact that an event may be covered by multiple broadcasters. As an example, a user may wish to hear his hometown announcer's play-by-play of a basketball game, normally available via radio or internet streaming, but may also want to see the game as it is broadcast by a national television network. Regular media consumers (of sports and news, for example) sometimes establish preferences and loyalties for such media sources. From the broadcaster's perspective, there are commercial reasons for making broadcasts available to loyal consumers. Media sources may respond to these loyalties by establishing and maintaining specific reporting profiles to retain and grow their audience. This consumer preference may drive ratings, which in turn may drive advertising sales.

Prior to the availability of digital delivery and pay-TV programmed delays, consumers may have mixed audio/visual streams covering the same event by manually turning the volume down on the TV during a broadcast, and turning the volume up on the radio broadcast. Digital delays (including programmed FCC delays and mechanical processing and delivery delays) have significantly eroded the functionality of this "analog solution." Now, live TV, cable, and radio broadcasts are frequently up to 10 seconds out of synchronization, producing an unacceptable media experience for those attempting to mix media streams in this manner. This situation is worsened by the fact that nationally broadcast feeds of live events are not broadcast in synchronicity. Often, the feed from one cable provider may be several seconds ahead or behind that of the same feed from a different cable or satellite provider.

BRIEF DESCRIPTION OF THE DRAWINGS/FIGURES

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems and computer program products for the synchronization of media streams. A media stream may be any digital data stream that includes audio and/or video data, where such data may portray, describe, or otherwise relate to some event. Example events may be, without limitation, sporting events or news events. Synchronization may refer to aligning media streams that relate to the same event, introducing or adjusting delays as necessary, such that the actions of the underlying event coincide as portrayed in the respective media streams. In an embodiment, a gross synchronization may first be performed on the media streams, using the broadcast delays of the streams. A refined synchronization may then be performed, taking advantage of corresponding visual or audio cues in each stream. In the event that the media streams represent the same content (e.g., the same content from different providers), matching momentary actions in the video media streams may be used to achieve refined synchronization. In the event that the media streams are different (e.g., different broadcasts of the same event), other cues may be used to achieve refined synchronization, where these other cues are part of the event being broadcast but independent of the particular broadcasts. Examples of these latter cues may be the sound of a referee's whistle or the crack of a bat hitting a baseball. In the whistle example, this cue may occur in any broadcast media stream relating, to the same game, for instance.

Figure 1:
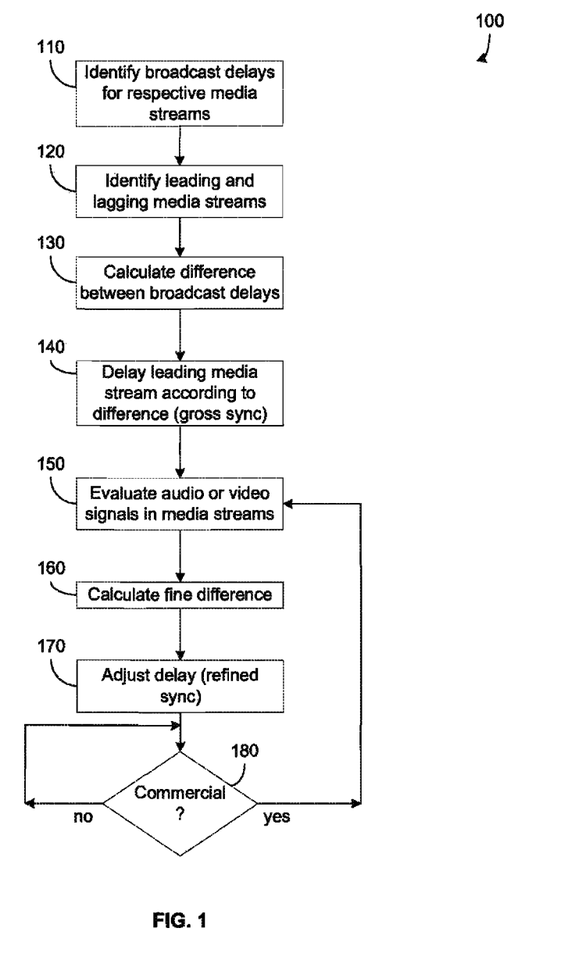
FIG. 1 is a flowchart illustrating the processing of the system described herein, in an embodiment where media streams are identical, according to an embodiment.

Processing for an embodiment where the media streams match is shown in FIG. 1. Here, the content may be identical. In an example, a national television network may broadcast a football game, where the broadcast is distributed through a cable provider in one city, but distributed through a different cable provider in a different market. Users may wish to synchronize these media streams, so that the users may watch them in synchronicity in different cities. This would allow the users to interact with each other over the telephone or via internet chat, where each user would see the same events at the same moment.

At 110, the broadcast delays for each of the two media streams may be identified. A broadcast delay may represent a programmed delay between the capture and distribution of live video or audio. Broadcast delays may differ for different distributors. In an embodiment, these delays may be ascertained by inspection of a timecode signature that accompanies each media stream. At 120, one media stream may be identified as the leading media stream, while the other may be identified as the lagging media stream. The leading media stream may be the stream that is closest in time to the actual event, i.e., having the shortest broadcast delay. The lagging media stream may be the stream with the longer broadcast delay. At 130, the difference between the two broadcast delays may be calculated. At 140, the leading media stream may be delayed by an amount of time equal to this difference. This may be viewed as an approximate, or gross synchronization, and this amount of time may be referred to herein as a gross synchronization delay. In an embodiment, the gross synchronization delay may be imposed using known digital video recording (DVR) technology.

At 150, evaluation of the media streams may be performed; here, particular cues in the two media streams may be detected, where these cues may eventually be used to achieve a more precise or refined synchronization. Here, a momentary action may be sought, where this momentary action is captured in both media streams. Such momentary actions may be in video or audio form. Examples may include the image of a kickoff in football, or the image of a clock in a basketball of football game, or the words of an announcer. Given that the two media streams represent the same content, these cues will appear in both streams. At 160, the time difference between the appearance of such a cue in the respective media streams may be determined. At 170, the delay created at 140 may be adjusted according to this latter time difference, thereby achieving refined synchronization. This latter time difference may be referred to herein as a refined synchronization delay. In an embodiment, the refined synchronization delay may be imposed using known DVR technology.

At 180, if a commercial advertisement appears, refined synchronization may be repeated after the commercial concludes. Such a repeat of a refined synchronization routine may likewise take place after any break in the media stream(s), whether a commercial, public service announcement, station identification, or the like.

Figure 2:
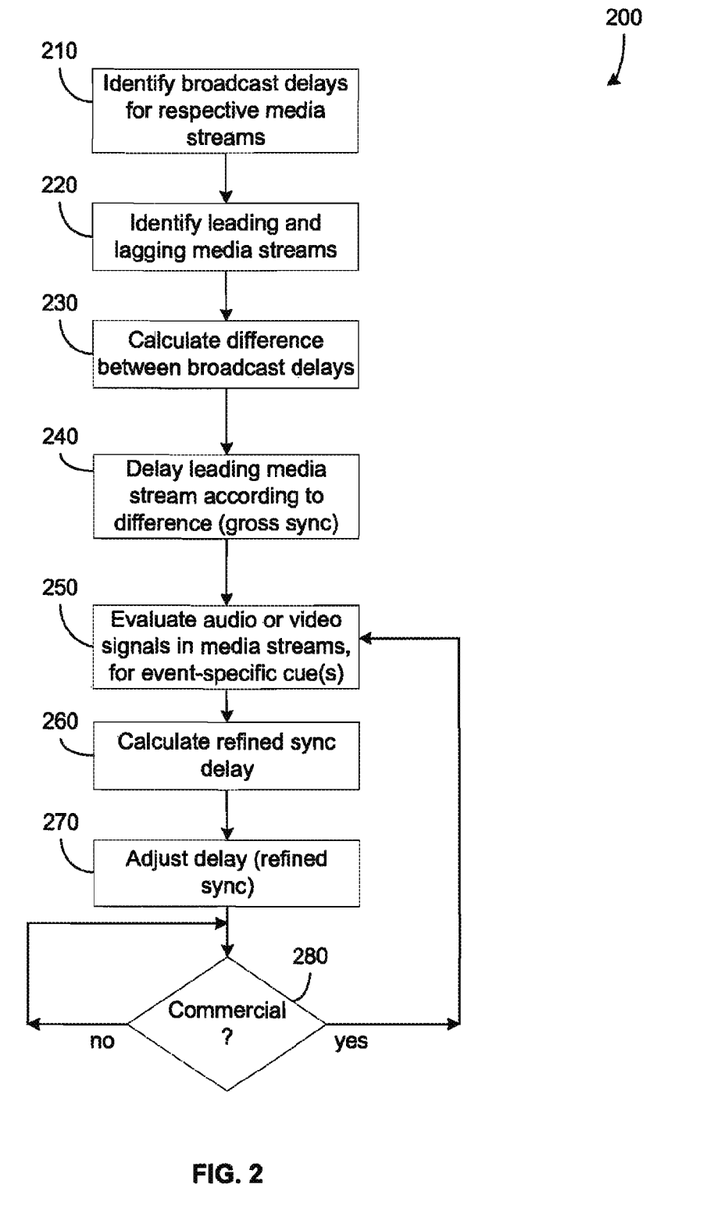
FIG. 2 is a flowchart illustrating the processing of the system described herein, in an embodiment where media streams are not identical, according to an embodiment.

If the media streams are not identical, a different approach may be required. This may be the case if, for example, synchronization is desired between a local broadcast of an event and a national broadcast of the same event, or between broadcasts of an event by different television networks. Here, different cameras may be used in each media stream under different technical directors, resulting in different camera angles on the same momentary actions, along with different switching of camera shots. Moreover, the audio commentary may be different. An approach for dealing with such a situation is illustrated in FIG. 2, according to an embodiment. At 210, the broadcast delays for each of the two media streams may be identified. In an embodiment, these delays may be ascertained by inspection of a timecode signature that accompanies each media stream, as in the case of FIG. 1. At 220, one media stream may be identified as the leading media stream, while the other may be identified as the lagging media stream. At 230, the difference between the two broadcast delays may be calculated. At 240, the leading media stream may be delayed by an amount of time equal to this difference, to achieve gross synchronization. This gross synchronization delay may be imposed using known DVR technology, in an embodiment.

At 250, particular cues in the two media streams may be detected, where these cues may eventually be used to achieve a more precise or refined synchronization. Here, common momentary actions captured in video or audio of the respective media streams may be sought, where these momentary actions are specific to the activity being broadcast rather than to the broadcasts. Examples may include the sound of a kickoff in football, where the thud of the kick is captured in the audio of both media streams. An example in the video realm may be the sudden motion that occurs after the puck is dropped in a faceoff of a hockey game. In this latter example, this sudden motion may be captured in any broadcast, albeit from different camera angles in different broadcasts.

At 260, the time difference between the appearance of such a cue in the respective media streams may be determined. At 270, the delay created at 240 may be adjusted according to this latter time difference, thereby achieving refined synchronization. The refined synchronization delay may be imposed using known DVR technology, in an embodiment. At 280, if a break occurs in the broadcast(s), whether a commercial, public service announcement, station identification, or the like, refined synchronization may be repeated.

Figure 3:
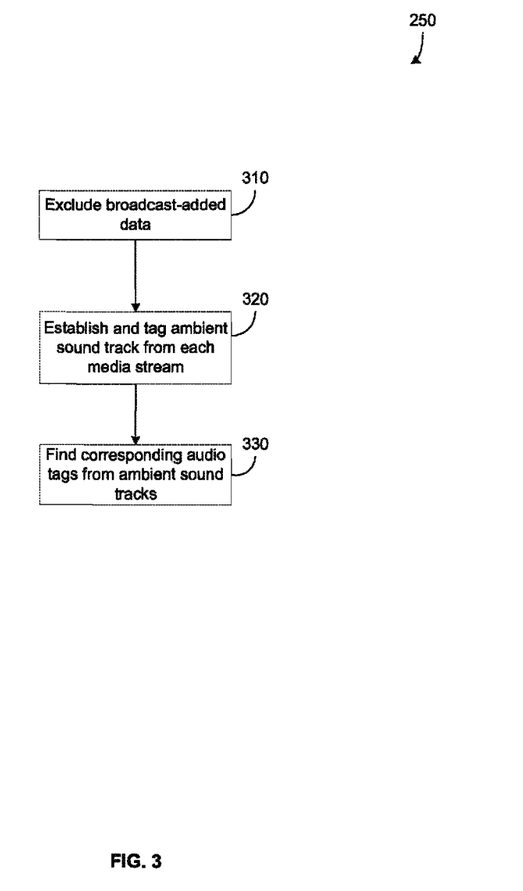
FIG. 3 is a flowchart illustrating evaluation of media streams for corresponding cues, where one of the media streams is an audio stream.

In an embodiment, the processing of 250 above may proceed as illustrated in FIG. 3. In the illustrated embodiment, the two media streams may consist of an audio media stream and an audio/video stream. At 310, any data added for purposes of the broadcast may be excluded. Such broadcast-added data may include the audio of any announcers, added music, or cutaways for example. The result may be an ambient track for each media stream, representing only the capture of the event. At 320, the ambient track for each media stream, once established, may be tagged for specific momentary audible actions, such as the thud of a kick or the crack of a bat. At 330, these points in the ambient tracks where such momentary actions are recorded may be identified. Here, these points may be correlated between the ambient tracks. Returning to the baseball bat example, the point in one ambient track at which the crack of the bat is heard will be associated with the point in the other ambient track at which this is heard. As shown in the embodiment of FIG. 2, the time difference between these two points may then be used to refine the synchronization between the media streams.

Figure 4:
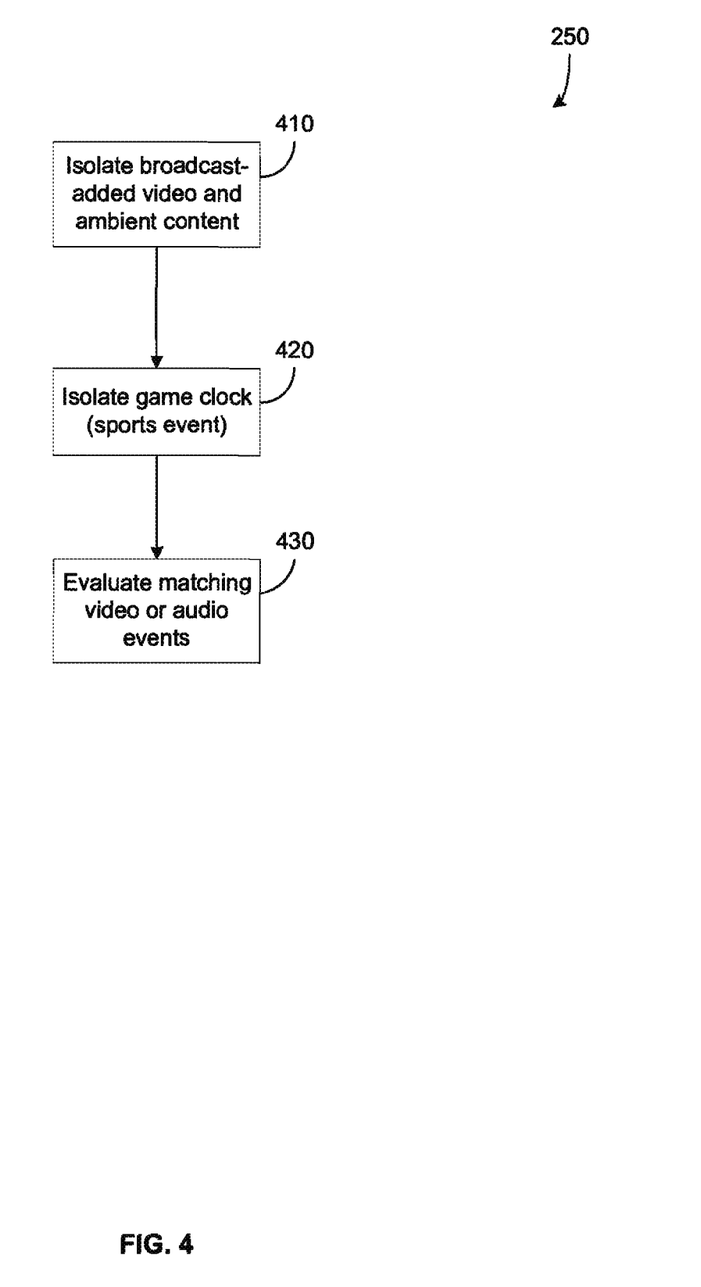
FIG. 4 is a flowchart illustrating evaluation of media streams for corresponding cues, where one of the media streams is an audio stream and the other media stream is an audio/video media stream.

In an alternative embodiment, where the two media streams both include video, video-recorded momentary actions may be considered instead of or in addition to audio cues. Such an embodiment is shown in FIG. 4. At 410, ambient content may be isolated (i.e., video and/or audio that stems from the actual event being broadcast), along with broadcast-added video. The latter may be used at 420, where a game clock may be used as a timing cue in the context of a sporting event. A view of a game clock is often shown in an added graphics layer to the video content. Here, the clock (e.g., its transitions from second to second) as captured in the video of the respective media streams may be used for purposes of refined synchronization. In addition to the game clock, or instead of it, other momentary actions captured on video or audio may be tagged in each media stream and evaluated, as cues for refined synchronization. Such momentary actions may be identified in each media stream and correlated between the respective media streams. An example may be the striking of a bat against a baseball, or the bounce of a basketball against a backboard. In both cases, the cues may be either in the ambient audio or video. Such cues may then be used as shown in FIG. 2. The time difference between corresponding cues may used to adjust the gross synchronization delay, thereby achieving refined synchronization.

In some cases, advertisements that occur in one media stream may be lost as a result of media stream synchronization. If, for example, a network broadcast of an event includes an advertisement for a product, but the user is receiving audio for the event through a different media stream, the user may not be exposed to product advertisement of the network broadcast. In an embodiment, metadata or other available data relating to the advertisement may be used to insert an ad for the same product into the audio stream heard by the user during the advertisement interval.

Figure 5:
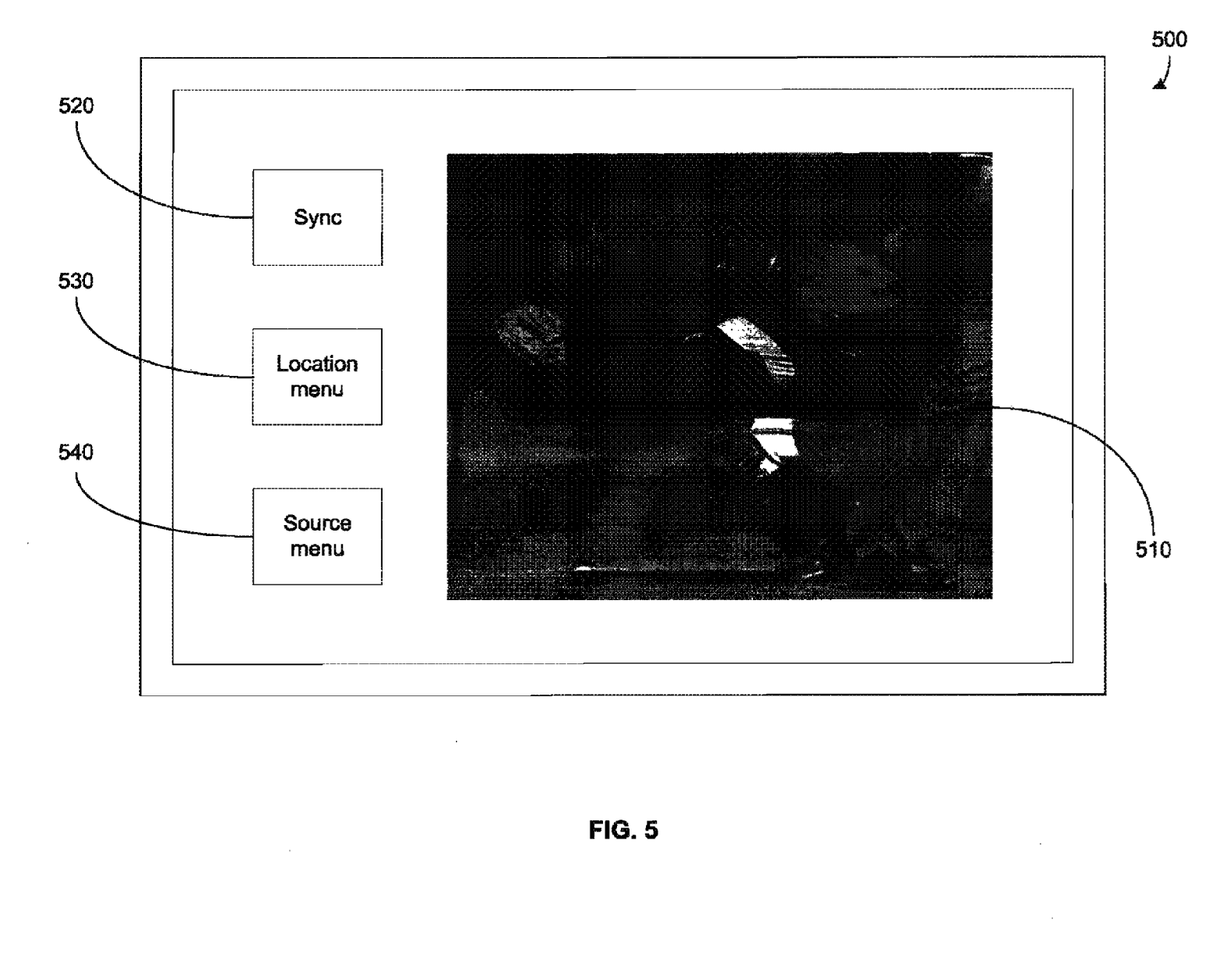
FIG. 5 is illustrates an embodiment of a user interface through which a user may access the system and processes described herein.

From a user perspective, the processing described herein may be used to synchronize two media streams under the control of the user via a user interface. An example of such an interface is shown in FIG. 5, according to an embodiment. The interface may include a display area 510 for video content, and controls or tabs 520, 530 and 540. Control 520 may be used to initiate a synchronization of media streams. In an embodiment, the system may assume that the user wishes to synchronize the media stream currently being displayed with another media stream covering the same event. The control 530 may allow the user to identify this other media stream by first designating the geographical location in which this other media stream is locally broadcast. In various embodiments, clicking on control 530 may initiate a drop down menu of states, cities or zip codes, or may include fields in which the user may otherwise specify a location. Clicking on control 540 may result in the presentation of specific sources for the desired media stream in the location designated via control 530.

Note that when refined synchronization is achieved, the user may experience a transition, where he may have been previously receiving one audio track, and after synchronization is receiving a different audio track. In an embodiment, the volume of the second audio track may be adjusted to roughly match that of the earlier audio track. This may prevent an unpleasant jarring effect of suddenly receiving much louder audio than had previously been received. An independent audio analysis may be performed on each media stream to determine the functional volume of each and auto-correct as necessary.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

A software embodiment of the functionality described above is illustrated in FIG. 6, according to an embodiment. The illustrated system 600 may include one or more programmable processor(s) 620 that execute logic corresponding to the above functionality. The system 600 may further include a body of memory 610. Programmable processor(s) 620 may include a central processing unit (CPU) and/or a graphics processing unit (GPU). Memory 610 may include one or more computer readable media that may store computer program logic 640. Memory 610 may be implemented as a hard disk and drive, a removable media such as a compact disk, a read-only memory (ROM) or random access memory (RAM) device, for example, or some combination thereof. Programmable processor(s) 620 and memory 610 may be in communication using any of several technologies known to one of ordinary skill in the art, such as a bus. Computer program logic 640 contained in memory 610 may be read and executed by programmable processor(s) 620. One or more I/O ports and/or I/O devices, shown collectively as I/O 630, may also be connected to processor(s) 620 and memory 610.

Figure 6:
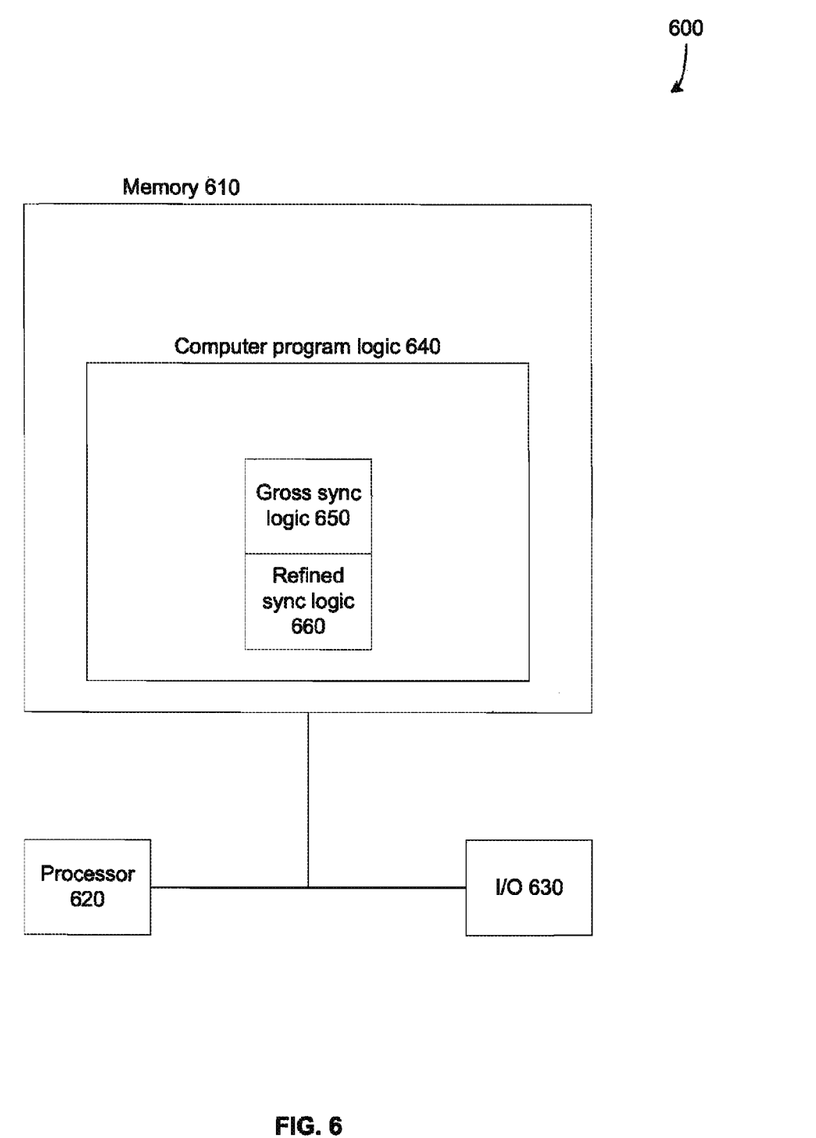
FIG. 6 is a block diagram illustrating a software or firmware embodiment in the context of a computing environment.

In the illustrated embodiment, computer program logic 640 may include gross synchronization logic 650, which may be responsible for determining the broadcast delays of the media streams, calculating the difference, and delaying the leading media stream as described above to achieve gross synchronization. Computer program logic 640 may also include refined synchronization logic 660, which may be responsible for identifying audio and/or video cues in the media streams, where these cues represent portrayals of the same momentary action. Refined synchronization logic may also be responsible for determining the time difference between these cues and adjusting the delay between the media streams to achieve refined synchronization.

In various embodiments, system 600 may be part of a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone, pager, one-way pager, two-way pager, messaging device, blackberry, MID, MP3 player, and so forth. The embodiments are not limited in this context.

In one embodiment, system 600 may be implemented as part of a wired communication system, a wireless communication system, or a combination of both. In one embodiment, for example, device 600 may be implemented as part of a mobile computing device having wireless capabilities. A mobile computing device may refer to any device having a processing system and a mobile power source or supply, such as one or more batteries, for example.

Examples of a mobile computing device may include a laptop computer, ultra-mobile PC, portable computer, handheld computer, palmtop computer, personal digital assistant (PDA), cellular telephone, combination cellular telephone/PDA, smart phone, pager, one-way pager, two-way pager, messaging device, data communication device, MID, MP3 player, and so forth.

In one embodiment, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A machine-implemented method, comprising:
    determining a first delay between an event and a first media stream of the event, wherein the first media stream includes an advertisement;
    determining a second delay between the event and a second media stream of the event;
    synchronizing the first and second media streams relative to one another based on a difference between the first and second delays to provide respective first and second synchronized media streams;
    identifying features of the first synchronized media stream that relate to features of the second synchronized media stream, wherein the features include one or more of audible features of the event and visual features of the event;
    further synchronizing the first and second synchronized media streams relative to one another to align the features of the first synchronized media stream with the related features of the second synchronized media stream to provide respective first and second further synchronized media streams;
    writing the first and second further synchronized media streams to a non-transitory computer-readable media to permit synchronous presentation of at least a portion of each of the first and second further synchronized media streams;
    inserting audio into one of the second media stream, the second synchronized media stream, and the second further synchronized media stream to correspond to video of the advertisement in the first media stream; and
    simultaneously presenting video of the first further synchronized media stream and audio of the second further synchronized media streams from the non-transitory computer-readable media.

2. The method of claim 1, wherein the each of the first and second media streams includes broadcaster-added audio commentary of the event, wherein the broadcaster-added audio commentary of the first media stream differs from the broadcaster-added audio commentary of the second media stream, and wherein the method further includes:
    simultaneously presenting video of the first further synchronized media stream and audio of the second further synchronized media streams from the non-transitory computer-readable media.

3. The method of claim 1, wherein the first and second media streams include identical content, wherein the first and second media streams are distributed by respective first and second media streaming sources, and wherein the method further includes:
    presenting the first further synchronized media stream to a user of the first source and present the second further synchronized media stream to a user of the second source based on user-input.

4. The method of claim 1, wherein each of the first and second synchronized media streams includes video of the event and broadcaster-added video, and wherein:
    the identifying features includes identifying a feature of the broadcaster-added video of the first media stream that relates to a feature of the broadcaster-added video of the second synchronized media stream; and
    the further synchronizing includes further synchronizing the first and second synchronized media streams relative to one another based on the related features of the respective broadcaster-added video.

5. The method of claim 4, wherein:
    the identifying features of the broadcaster-added video includes identifying a broadcaster-added event clock within each of the first and second synchronized media streams, wherein the event clocks are associated with the event; and
    the further synchronizing further includes further synchronizing the first and second synchronized media streams relative to one another based on the respective event clocks.

6. A machine-implemented method, comprising:
    determining a first delay between an event and a first media stream of the event;
    determining a second delay between the event and a second media stream of the event;
    synchronizing the first and second media streams relative to one another based on a difference between the first and second delays to provide respective first and second synchronized media streams;
    identifying features of the first synchronized media stream that relate to features of the second synchronized media stream, wherein the features include one or more of audible features of the event and visual features of the event;
    further synchronizing the first and second synchronized media streams relative to one another to align the features of the first synchronized media stream with the related features of the second synchronized media stream to provide respective first and second further synchronized media streams; and
    writing the first and second further synchronized media streams to a non-transitory computer-readable media to permit synchronous presentation of at least a portion of each of the first and second further synchronized media streams;
    wherein each of the first and second synchronized media streams includes audio of the event and broadcaster-added audio, and wherein the method further includes removing the broadcaster-added audio from the first and second synchronized media streams to provide respective first and second synchronized ambient media streams of the event;
    wherein the identifying features includes identifying audio features of the first synchronized ambient media stream that relate to audio features of the second synchronized ambient media stream; and
    wherein the further synchronizing includes further synchronizing the first and second synchronized ambient media streams relative to one another to align the audio features of the first synchronized ambient media stream with the related audio features of the second synchronized ambient media stream to provide the first and second further synchronized media streams.

7. A machine-implemented method, comprising:
    determining a first delay between an event and a first media stream of the event;
    determining a second delay between the event and a second media stream of the event;
    synchronizing the first and second media streams relative to one another based on a difference between the first and second delays to provide respective first and second synchronized media streams;
    identifying features of the first synchronized media stream that relate to features of the second synchronized media stream, wherein the features include one or more of audible features of the event and visual features of the event;

further synchronizing the first and second synchronized media streams relative to one another to align the features of the first synchronized media stream with the related features of the second synchronized media stream to provide respective first and second further synchronized media streams; and writing the first and second further synchronized media streams to a non-transitory computer-readable media to permit synchronous presentation of at least a portion of each of the first and second further synchronized media streams;

wherein each of the first and second media streams includes audio and video of the event, wherein the video of the event of the first media stream differs from the video of the event of the second media stream with respect to one or more of camera position, camera angle, and camera switching;

wherein the identifying features includes identifying an event action in the first media stream based on one or more of the video and audio of the event in the first synchronized media stream, and identifying the event action in the second media stream based on one or more of the video and audio of the event in second synchronized media stream; and wherein the further synchronizing includes further synchronizing the first and second synchronized media streams relative to one another based on the event action in the respective first and second synchronized media streams.

8. A non-transitory computer readable medium encoded with a computer program that includes instructions to cause a processor to:

determine a first delay between an event and a first media stream of the event, wherein the first media stream includes an advertisement;

determine a second delay between the event and a second media stream of the event;

synchronize the first and second media streams relative to one another based on a difference between the first and second delays to provide respective first and second synchronized media streams;

identify features of the first synchronized media stream that relate to features of the second synchronized media stream, wherein the features include one or more of audible features of the event and visual features of the event;

further synchronize the first and second synchronized media streams relative to one another to align the features of the first synchronized media stream with the related features of the second synchronized media stream to provide respective first and second further synchronized media streams;

write the first and second further synchronized media streams to the non-transitory computer-readable media to permit synchronous presentation of at least a portion of each of the first and second further synchronized media streams;

insert audio into one of the second media stream, the second synchronized media stream, and the second further synchronized media stream to correspond to video of the advertisement in the first media stream; and simultaneously present video of the first further synchronized media stream and audio of the second further synchronized media streams from the non-transitory computer-readable media.

9. The non-transitory computer readable medium of claim 8, wherein the each of the first and second media streams includes broadcaster-added audio commentary, wherein the broadcaster-added audio commentary of the first media stream differs from the broadcaster-added audio commentary of the second media stream, and wherein the instructions include instructions to cause the processor to:

simultaneously present video of the first further synchronized media streams and audio of the second further synchronized media streams from the non-transitory computer-readable media.

10. The non-transitory computer readable medium of claim 8, wherein the first and second media streams include identical content, wherein the first and second media streams are distributed by respective first and second media streaming sources, and wherein the instructions include instructions to cause the processor to:

provide the first further synchronized media stream to a device of a user of the first source and to provide the second further synchronized media stream to a device of a user of the second source based on user-input.

11. The non-transitory computer readable medium of claim 8, wherein each of the first and second synchronized media streams includes video of the event and broadcaster-added video, and wherein:

the instructions to cause the processor to identify features include instructions to cause the processor to identify a feature of the broadcaster-added video of the first media stream that relates to a feature of the broadcaster-added video of the second synchronized media stream; and the instructions to cause the processor to further synchronize include instructions to cause the processor to further synchronize the first and second synchronized media streams relative to one another based on the related features of the respective broadcaster-added video.

12. The non-transitory computer readable medium of claim 11, wherein:

the instructions to cause the processor to identify features include instructions to cause the processor to identify a broadcaster-added event clock within each of the first and second synchronized media streams, wherein the event clocks are associated with the event; and the instructions to cause the processor to further synchronize include instructions to cause the processor to further synchronize the first and second synchronized media streams relative to one another based on the respective event clocks.

13. A non-transitory computer readable medium encoded with a computer program that includes instructions to cause a processor to:

determine a first delay between an event and a first media stream of the event;

determine a second delay between the event and a second media stream of the event;

synchronize the first and second media streams relative to one another based on a difference between the first and second delays to provide respective first and second synchronized media streams;

identify features of the first synchronized media stream that relate to features of the second synchronized media stream, wherein the features include one or more of audible features of the event and visual features of the event;

further synchronize the first and second synchronized media streams relative to one another to align the features of the first synchronized media stream with the related features of the second synchronized media stream to provide respective first and second further synchronized media streams;

write the first and second further synchronized media streams to the non-transitory computer-readable media to permit synchronous presentation of at least a portion of each of the first and second further synchronized media streams;

wherein each of the first and second synchronized media streams includes audio of the event and broadcaster-added audio, and wherein the instructions further include instructions to cause the processor to remove the broadcaster-added audio from the first and second synchronized media streams to provide respective first and second synchronized ambient media streams of the event;

wherein the instructions to cause the processor to identify features include instructions to cause the processor to identify audio features of the first synchronized ambient media stream that relate to audio features of the second synchronized ambient media stream; and wherein the instructions to cause the processor to further synchronize include instructions to cause the processor to further synchronize the first and second synchronized ambient media streams relative to one another to align the audio features of the first synchronized ambient media stream with the related audio features of the second synchronized ambient media stream to provide the first and second further synchronized media streams.

14. A non-transitory computer readable medium, encoded with a computer program that includes instructions to cause a processor to:

determine a first delay between an event and a first media stream of the event;

determine a second delay between the event and a second media stream of the event;

synchronize the first and second media streams relative to one another based on a difference between the first and second delays to provide respective first and second synchronized media streams;

identify features of the first synchronized media stream that relate to features of the second synchronized media stream, wherein the features include one or more of audible features of the event and visual features of the event;

further synchronize the first and second synchronized media streams relative to one another to align the features of the first synchronized media stream with the related features of the second synchronized media stream to provide respective first and second further synchronized media streams; and write the first and second further synchronized media streams to the non-transitory computer-readable media to permit synchronous presentation of at least a portion of each of the first and second further synchronized media streams;

wherein each of the first and second media streams includes video and audio of the event, and wherein the video of the event of the first media stream differs from the video of the event of the second media stream with respect to one or more of camera position, camera angle, and camera switching;

wherein the instructions to cause the processor to identify features include instructions to cause the processor to identify an event action in the first media stream based on one or more of the video and audio of the event in first synchronized media stream, and identify the event action in the second media stream based on one or more of the video and audio of the event in the second synchronized media stream; and wherein the instructions to cause the processor to further synchronize include instructions to cause the processor to further synchronize the first and second synchronized media streams relative to one another based on the event action in the respective first and second synchronized media streams.

15. A system, comprising a processor and memory configured to:

determine a first delay between an event and a first media stream of the event;

determine a second delay between the event and a second media stream of the event;

synchronize the first and second media streams relative to one another based on a difference between the first and second delays to provide respective first and second synchronized media streams;

identify features of the first synchronized media stream that relate to features of the second synchronized media stream, wherein the features include one or more of audible features of the event and visual features of the event;

further synchronize the first and second synchronized media streams relative to one another to align the features of the first synchronized media stream with the related features of the second synchronized media stream to provide respective first and second further synchronized media streams; and write the first and second further synchronized media streams to a non-transitory computer-readable media to permit synchronous presentation of at least a portion of each of the first and second further synchronized media streams;

wherein the first and second media streams each include video and audio of the event, wherein the video of the event of the first media stream differs from the video of the event of the second media stream with respect to one or more of camera position, camera angle, and camera switching, and wherein the processor and memory are further configured to, perform the identify features to identify an event action in the first media stream based on one or more of the video and audio of the event in first synchronized media stream, and to identify the event action in the second media stream based on one or more of the video and audio of the event in the second synchronized media stream, and perform the further synchronize to further synchronize the first and second synchronized media streams relative to one another based on the event action in the respective first and second synchronized media streams.

16. The system of claim 15, wherein each of the first and second synchronized media streams further include video of the event and broadcaster-added video, and wherein the processor and memory are further configured to:

perform the identify features to identify a feature of the broadcaster-added video of the first media stream that relates to a feature of the broadcaster-added video of the second synchronized media stream; and perform the further synchronize to further synchronize the first and second synchronized media streams relative to one another based on the related features of the respective broadcaster-added video.

17. A system, comprising:

determine a first delay between an event and a first media stream of the event;

determine a second delay between the event and a second media stream of the event;

synchronize the first and second media streams relative to one another based on a difference between the first and second delays to provide respective first and second synchronized media streams;

identify features of the first synchronized media stream that relate to features of the second synchronized media stream, wherein the features include one or more of audible features of the event and visual features of the event;

further synchronize the first and second synchronized media streams relative to one another to align the features of the first synchronized media stream with the related features of the second synchronized media stream to provide respective first and second further synchronized media streams; and write the first and second further synchronized media streams to a non-transitory computer-readable media to permit synchronous presentation of at least a portion of each of the first and second further synchronized media streams;

wherein each of the first and second synchronized media streams include audio of the event and broadcaster-added audio, and wherein the processor and memory are further configured to, remove the broadcaster-added audio from the first and second synchronized media streams to provide respective first and second synchronized ambient media streams of the event, perform the identify features to identify audio features of the first synchronized ambient media stream that relate to audio features of the second synchronized ambient media stream, and perform the further synchronize to further synchronize the first and second synchronized ambient media streams relative to one another to align the audio features of the first synchronized ambient media stream with the related audio features of the second synchronized ambient media stream to provide the first and second further synchronized media streams.

\* \* \* \* \*